United States Patent [19]

Tanaka et al.

[11] Patent Number: 5,040,098
[45] Date of Patent: Aug. 13, 1991

[54] BACKLIGHT FOR AN ELECTRONIC DISPLAY

[75] Inventors: Akira Tanaka; Shinpei Nagatani, both of Kawasaki; Masahiro Tomatsu; Kazumasa Kaiwa, both of Yokohama; Kazuaki Yamagishi, Yokohama; Katsumi Yashiro, Yokohama, all of Japan

[73] Assignees: Fujitsu Limited, Kawasaki; Fujitsu Kasei Ltd., Yokohama, both of Japan

[21] Appl. No.: 507,435

[22] Filed: Apr. 11, 1990

[30] Foreign Application Priority Data

Apr. 13, 1989 [JP] Japan .................................. 1-91955

[51] Int. Cl.$^5$ .............................................. F21V 8/00
[52] U.S. Cl. ...................................... 362/31; 362/26
[58] Field of Search ......................... 362/23, 26, 31, 32

[56] References Cited

U.S. PATENT DOCUMENTS

| | | | |
|---|---|---|---|
| 3,561,145 | 2/1971 | Shotwell | 362/26 |
| 4,257,084 | 3/1981 | Reynolds | 362/31 |
| 4,373,282 | 2/1983 | Wragg | 362/31 |
| 4,724,068 | 3/1988 | Ohe | 362/26 |
| 4,729,067 | 3/1988 | Ohe | 362/26 |

FOREIGN PATENT DOCUMENTS 3208162  10/1982  Fed. Rep. of Germany ........ 362/31

Primary Examiner—Ira S. Lazarus
Assistant Examiner—Sue Hagarman
Attorney, Agent, or Firm—Armstrong, Nikaido, Marmelstein, Kubovcik & Murray

[57] ABSTRACT

A backlight having a reflection plate, a diffusion plate, a transparent light guide plate held between the diffusion plate and the reflection plate and having a reflection and diffusion surface adjacent to the reflection plate and a recessed light emitting surface adjacent to the diffusion plate, so that a space is defined between the recessed light emitting surface and the bottom surface of the diffusion plate adjacent thereto, a holder connected to the diffusion plate to define accommodation spaces between the opposite ends of the transparent light guide plate and the holder, and line light sources located in the accommodation spaces.

15 Claims, 5 Drawing Sheets

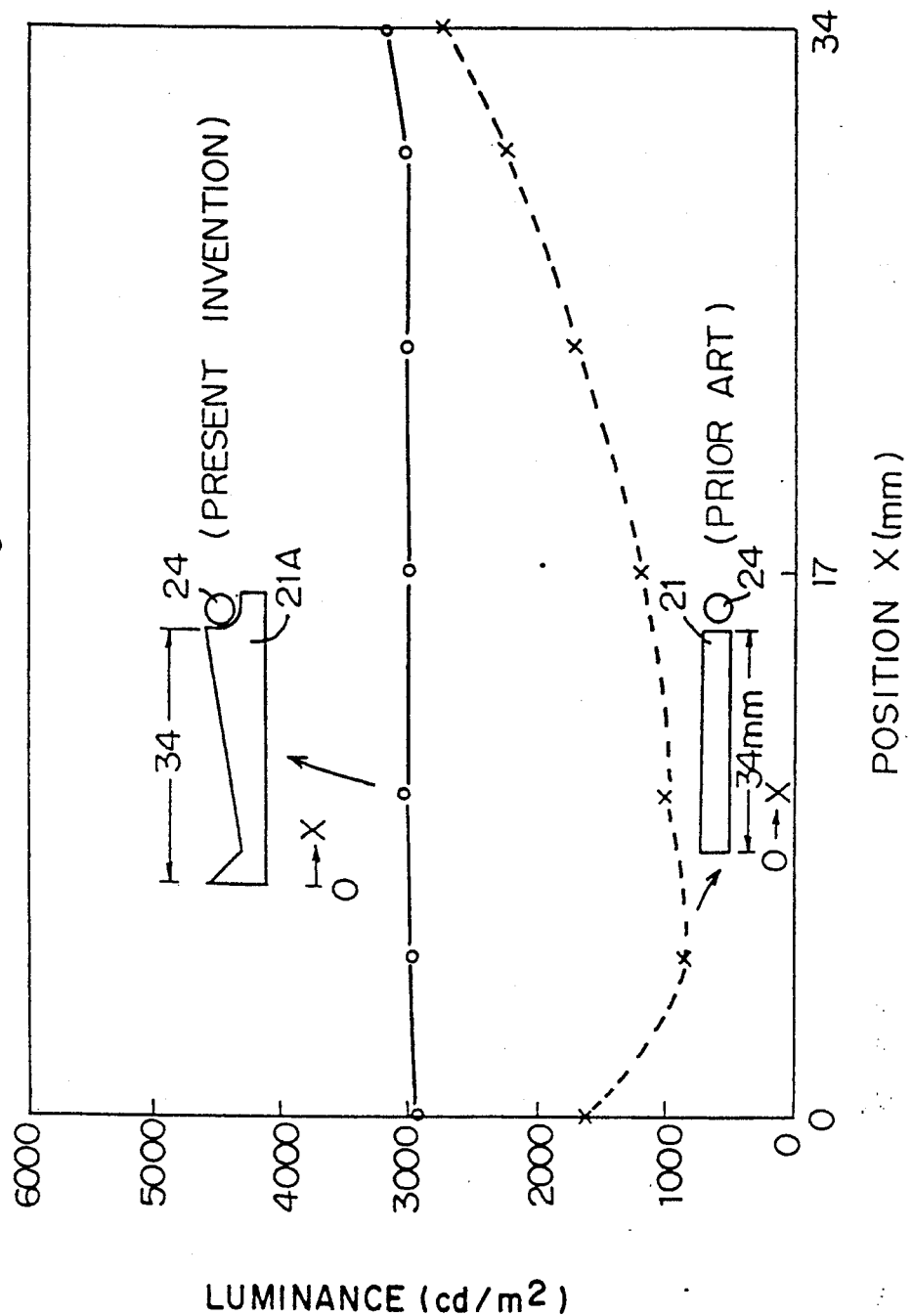

BACKLIGHT FOR AN ELECTRONIC DISPLAY

BACKGROUND OF THE INVENTION

1. Field of the Invention

The present invention relates to a backlight with a planar spread by which a display panel or the like is illuminated from behind.

The backlight of the present invention can be advantageously used with a device requiring a high luminance, such as a color liquid crystal TV or various office automation (OA) devices, but is not limited to such usages.

2. Description of the Related Art

A backlight which can provide a planar illumination is incorporated in an instrument panel of an automobile or airplane, etc., and recently the application of such a backlight has been widened to include a liquid crystal TV or a liquid crystal display.

As can be seen in FIG. 8, a conventional backlight usually has a transparent light guide plate 12 of acrylic resin or the like which is located between two cold-cathode tubes 11, so that light emitted from the cold-cathode tubes 11 is transmitted through the transparent light guide plate 12 and is totally reflected by a reflecting surface 13 which has a rough finished surface. Consequently, the reflected light is emitted from the light guide plate 12 and is made incident on a display panel 14 for display, such as a liquid crystal panel, through a diffusion plate 15 located in front of the light guide plate 12.

The conventional backlight as shown in FIG. 8 has the following drawbacks:

① the light guide plate 12 is a solid flat plate and thus is heavy;

② no emitted light scattered in different directions from the cold-cathode tubes 11 is effectively made incident on the light guide plate 12, and thus a satisfactory luminance cannot be obtained; and, ③ due to an irregular roughness of the reflecting surface 13, there is a tendency for the occurrence of an irregular luminance of the display surface of the backlight.

The primary object of the present invention is to provide a light and thin backlight having a high luminance and a uniform luminance distribution.

SUMMARY OF THE INVENTION

To achieve the object mentioned above, according to one aspect of the present invention, there is provided a backlight comprising a reflection plate, a diffusion plate, a transparent light guide plate held between the diffusion plate and the reflection plate and having a reflection and diffusion surface adjacent to the reflection plate and a recessed light emitting surface adjacent to the diffusion plate, so that a space is defined between the recessed light emitting surface and the bottom surface of the diffusion plate adjacent thereto, a holder connected to the diffusion plate to define accommodation spaces between opposite ends of the transparent light guide plate and the holder, and line light sources located in the accommodation spaces.

According to another aspect of the present invention, there is provided a backlight comprising a reflection plate, a diffusion plate, a transparent light guide plate held between the diffusion plate and the reflection plate and having a reflection and diffusion surface adjacent to the reflection plate and a recessed light emitting surface adjacent to the diffusion plate, so that a space is defined between the recessed light emitting surface and the bottom surface of the diffusion plate adjacent thereto, a holder connected to the diffusion plate to define an accommodation space between the associated one end of the transparent light guide plate and the holder, and a line light source located in the accommodation space.

The space defined between the generally V-shaped recessed light emitting surface and the diffusion plate contributes to the obtaining of a bright backlight and a uniform luminance distribution. The rounded surface(s) provided on the end(s) of the transparent light guide plate serve as a light introduction surface(s) through which the incident light from the line light source can be effectively introduced into the transparent light guide plate.

When the line light sources are located on the opposite end sides of the transparent light guide plate, the V-shaped recessed light emitting surface is preferably located at the center of the transparent light guide plate, in cross section, so that the incident light from the line light sources in opposite directions can be effectively and uniformly emitted therefrom through the diffusion plate.

When one line light source is provided on only one end of the transparent light guide plate, the apex of the V-shaped recessed emitting surface of the transparent light guide plate is preferably off-set from the center and located closer to the end of the transparent light guide plate far from the line light source, so that the incident light from one end of the transparent light guide plate effectively reaches the opposite end thereof or the vicinity thereof. As a result, light can be substantially uniformly emitted from the transparent light guide plate through the diffusion plate.

BRIEF DESCRIPTION OF THE DRAWINGS

The invention will be described below in detail with reference to the accompanying drawings in which:

FIG. 7 is a diagram showing a luminance distribution of a backlight shown in FIG. 5, in comparison with a prior art; and, FIG. 8 is a schematic cross sectional view of a known backlight according to a prior art.

DESCRIPTION OF THE PREFERRED EMBODIMENTS

Figure 1:
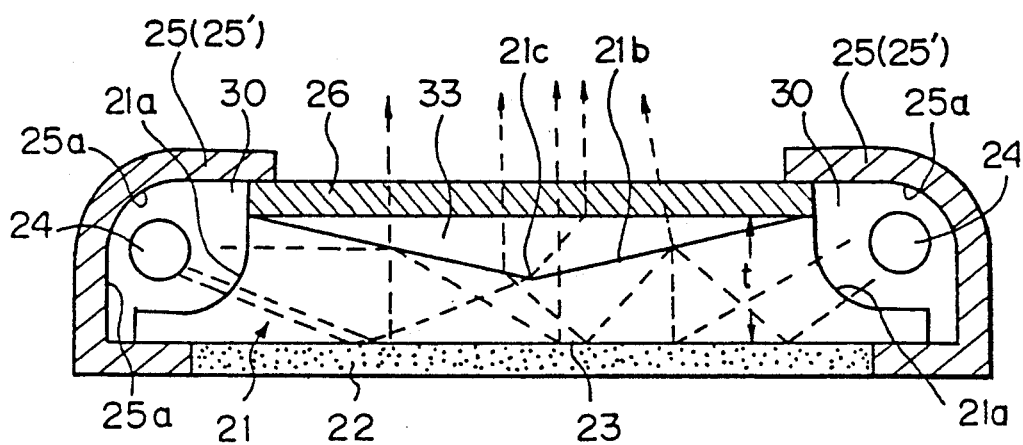
FIG. 1 is a schematic cross sectional view of a backlight according to one aspect of the present invention.

FIG. 1 shows a backlight having two line light sources 24 provided on the opposite ends of a transparent light guide plate 21. In the illustrated embodiment, the line light sources 24 are in the form of cold-cathode tubes or heat-cathode tubes (tungsten lamp or halogen lamp, etc.). The light guide plate 21 is made of, for example, transparent acrylic resin plate or the like. It is also possible to make the light guide plate 21 of a polymer (resin based on acrylic polymer or polycarbonate, or the like) containing organic fluorescent dyes (perylen dyes or naphthalimide pigment, etc.) to emit illumination light having a desired color tone from the light guide plate by properly adjusting the kind or density, etc. of the pigments.

The light guide plate 21 is held between and by a diffusion plate 26 (top side) and a reflection plate 22 (bottom side). The reflection plate 22, which is made of metal or plastic, reflects light through a diffusion layer 23 formed on the surface of the light guide plate 21 facing the diffusion plate 26. The diffusion layer 23 is formed on the surface of the light guide plate 21 by, for example an aluminum deposition or silk printing process using a white ink. The diffusion plate 26 provides a uniform distribution of light emitted from the light guide plate 21 as scatter light outside of the backlight.

The line light sources 24 are housed in closed accommodation spaces 30 defined in a holder 25 secured to the opposite ends of the diffusion plate 26. Namely, the accommodation spaces 30 are formed between the holder 25 and the light guide plate 21.

The holder 25 has a pair of identical holder plates 25' having a quadrant-shape portion in cross section and connected to the opposite ends of the diffusion plate 26 and the opposite ends of the reflection plate 22. Each of the holder plates 25' has an inner rounded reflection surface 25a. Alternatively, it is possible to make the holder plates 25' of a reflecting material as a whole. The holder plates 25' reflect light emitted from the light sources 24 to a direction opposite to the light guide plate 21, which would otherwise be emitted through the holder plates 25', so that the reflected light can be effectively made incident upon the light guide plate 21. The holder 25 also hold the light sources 24 in the accommodation spaces 30.

Figure 2:
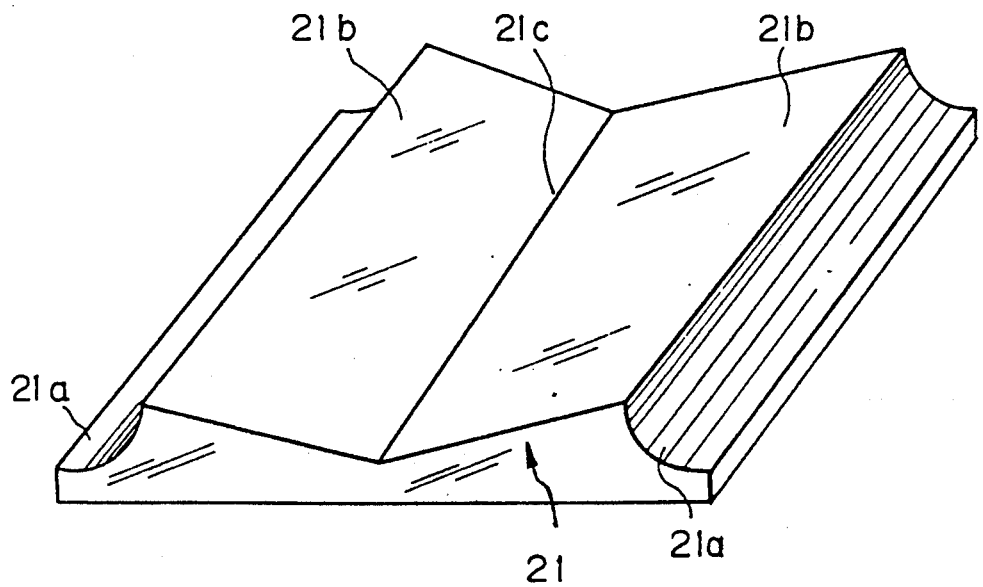
FIG. 2 is a perspective view of a transparent light guide plate shown in FIG. 1.

Preferably, as can be seen in FIG. 2, the light guide plate 21 is provided at opposite ends thereof with rounded light receiving surfaces 21a in the form of a quadrant similar to the holder plates 25', so that the light sources 24 are surrounded by the opposed rounded surfaces, i.e., the rounded reflecting surfaces 25a of the holder plates 25' and the rounded receiving surfaces 21a of the light guide plate 21. In the illustrated embodiment, the line light sources 24 have a generally circular cross section, so that the rounded reflecting surfaces 25a and the rounded receiving surfaces 21a correspond to the circular profile of the associated light sources 24. Accordingly, on one hand light from the light sources 24 is substantially uniformly and directly introduced into the light guide plate 21 through the rounded light receiving surfaces 21a thereof, and on the other hand, light scattered in directions opposite to the light guide plate 21 is reflected by the reflecting surfaces 25a of the holder plates 25' and is substantially uniformly introduced into the light guide plate 21 through the rounded light receiving surfaces 21a thereof. Namely, the rounded light receiving surfaces 21a of the light guide plate 21 serve as light collectors which effectively collect light scattered from the light sources 24 into the light guide plate 21.

An upper surface of the light guide plate 21 defines a recessed light emitting surface 21b which faces the diffusion plate 26 to define a generally triangular air space 33 between the light guide plate 21 and the diffusion plate 26. The light emitting surface 21b is generally V-shape in cross section. The recessed surface 21b is defined by two convergent tapered surfaces which substantially uniformly emit light which is transmitted through the light guide plate 21 to the diffusion plate 26. In the prior art, as mentioned above, the light guide plate 21 has a flat top surface, unlike the present invention. The tapered surfaces of the V-shaped emitting surface 21b increase the surface area through which light is emitted, in comparison with the prior art. This results in a striking increase in the quantity of light which can be emitted from the emitting surface of the light guide plate 21. Note that the space 33 can be filled with a solid optical material such as a glass, but an air space is more preferable because, when light is emitted to the air from the emitting surface 21b, a higher uniformity of luminance distribution due to a propagation of light in the air can be expected.

The apex 21c of the V-shape is preferably located at the center of the light guide plate 21. Namely, the light guide plate 21 is symmetrical in cross section with respect to a vertical line passing through the apex 21c of the V-shape. This makes it possible to uniformly emit light from the whole outgoing surface 21b. Furthermore, the symmetrical shape of the outgoing surface 21b prevents a serious deterioration of the luminance distribution of light emitted from the whole of the emitting surface 21b even if one of the light sources 24 is broken or is made OFF. Namely, as shown in FIG. 1, assuming that the right light source 24 is broken or is made OFF, light from the left light source 24 is transmitted through the light guide plate 21 while being repeatedly diffused by the diffusion layer 23 and reflected by the reflection plate 22, so that light is emitted from not only the left tapered surface of the emitting surface 21b but also the right tapered surface thereof, as shown by imaginary lines, and as a result, the right side does not become dark.

Figure 6:
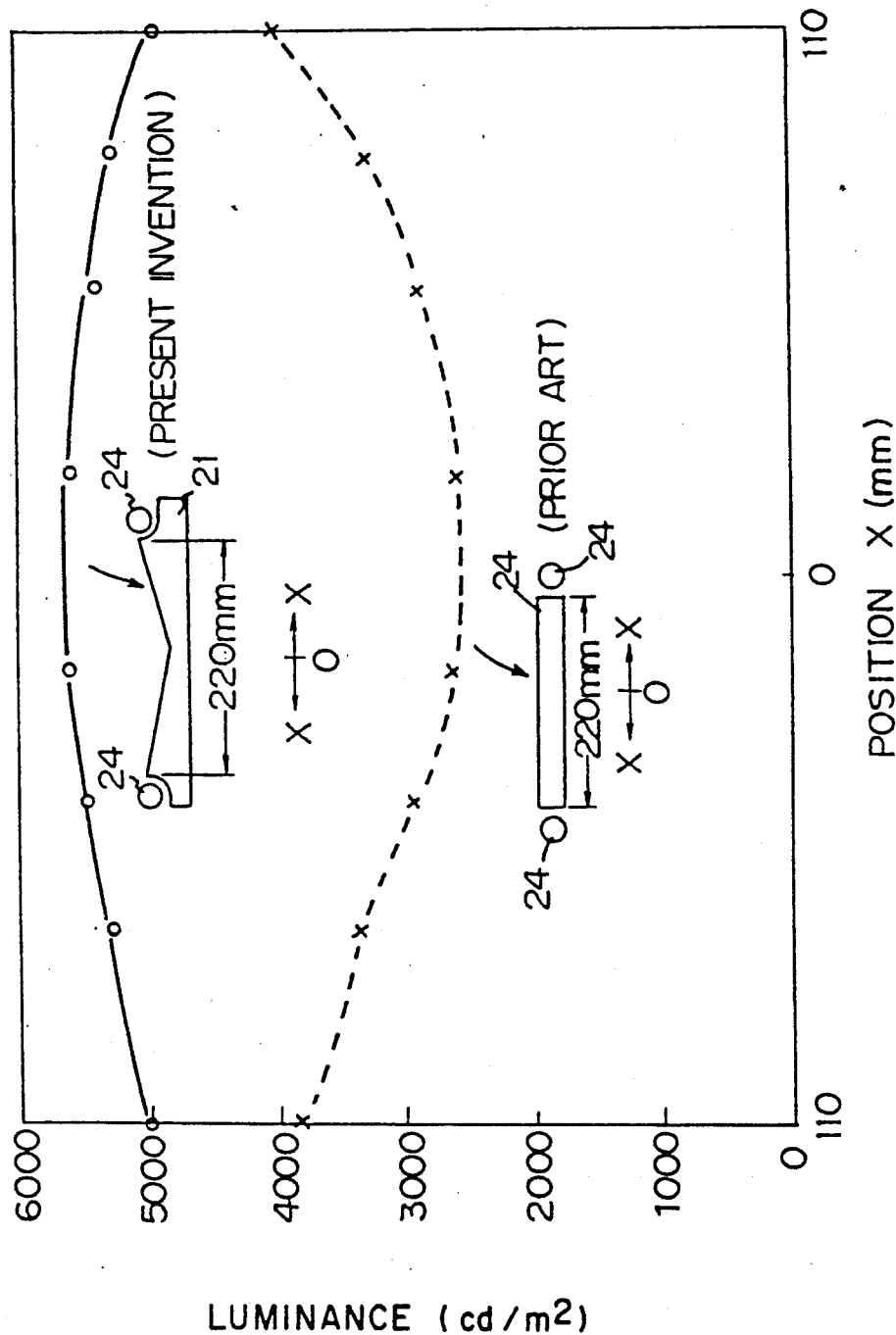
FIG. 6 is diagram showing a luminance distribution of a backlight shown in FIG. 1, in comparison with a prior art.

In an example in which the thickness t of the light guide plate 12 made from a 220 mm × 220 mm (plan view) square acrylic plate with a V-shaped recess was 10 mm, and the light sources 24 were two cold-cathode tube lamps, the average luminance of the surface of the diffusion plate 26, detected by an inverter under an input power of 5.0 V and 0.5 A and a second power of 284 $V_{ac}$ and 3.8 mA, was 5202 cd/m$^2$ as shown in FIG. 6. As can be seen in FIG. 6, a substantially uniform luminance distribution (solid line) can be obtained according to the present invention, in comparison with the prior art in which the light guide plate is made of a planer plate having a flat emitting surface (imaginary line).

Figure 3:
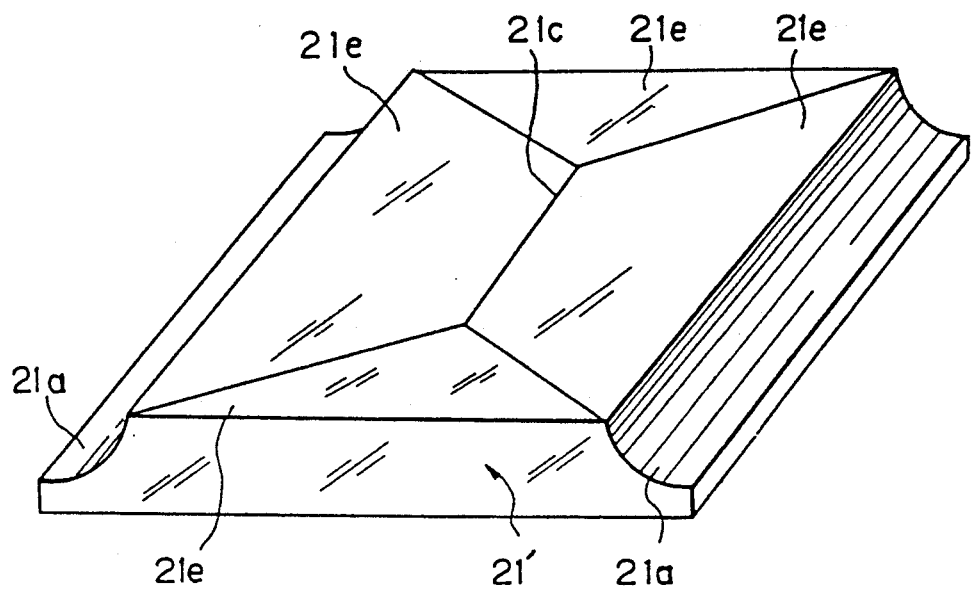
FIG. 3 is a perspective view of another transparent light guide plate.

FIG. 3 shows a modified light guide plate 21'. In the embodiment shown in FIG. 2, the light guide plate 21 has a uniform cross sectional shape, but in the embodiment shown in FIG. 3, the light guide plate 21' has tapered surfaces 21e on opposite sides in the direction perpendicular to the sheet of the drawing. Namely, the light guide plate 21' shown in FIG. 3 has a light emitting surface consisting of four tapered surfaces 21e. The surface area of the light emitting surface of the light guide plate 21' shown in FIG. 3 is larger than that of the light guide plate 21 shown in FIG. 2.

Figure 4:
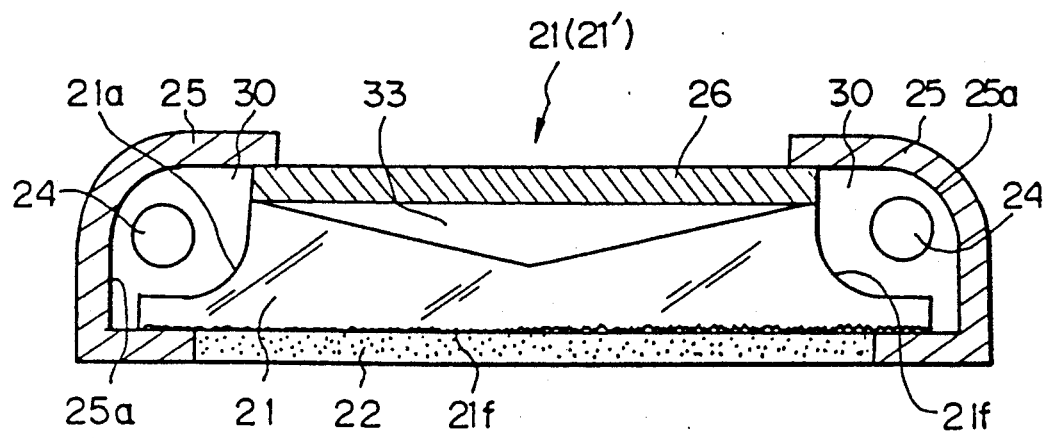
FIG. 4 is a schematic cross sectional view of a backlight according to a modified embodiment of the present invention.
Figure 8:
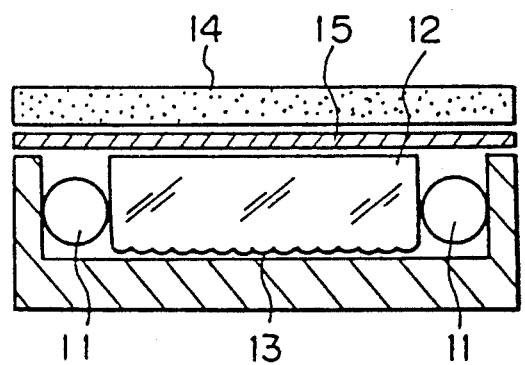

FIG. 4 shows a modified embodiment of the present invention, in which the light guide plate 21 (or 21') has a bottom surface 21f, which is a rough finished surface and which increases the total reflection effect, similar to the prior art shown in FIG. 8.

Figure 5:
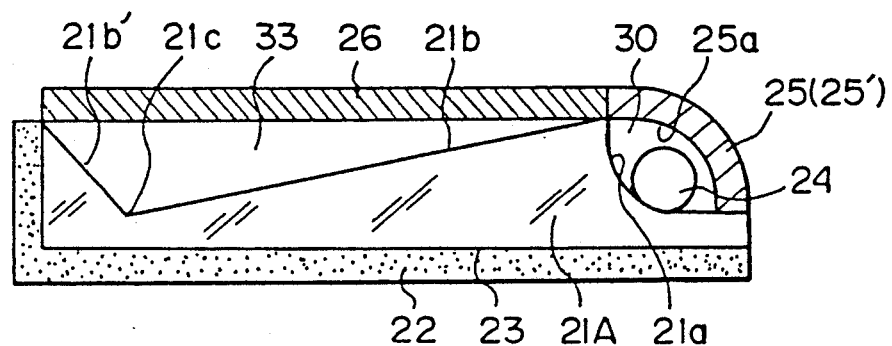
FIG. 5 is a schematic cross sectional view of a backlight according to another aspect of the present invention.

FIG. 5 shows another embodiment of a backlight in which only one line light source 24 is provided. Namely, in FIG. 5, the light source 24 is provided in the accommodation space 30 formed on only one side of the light guide plate 21A, i.e., the right side thereof in FIG. 5. The holder 25 is comprised of one holder plate 25' provided on the right side of the light guide plate 21A. The holder plate 25' is substantially same as the holder plates 25, in FIG. 1. In FIG. 5, components corresponding to those in FIG. 1 are given the same reference numerals as in FIG. 1. The opposite side of the light guide plate 21A is surrounded by the diffusion plate 22. In FIG. 5, the generally V-shaped recess 21b is not a symmetrical shape but an eccentric V-shape, unlike FIG. 1. Namely, the apex 21c of V is off-set from the center, closer to the end of the light guide plate, i.e., far from the light source 24, to define a triangular air space 33 between the light guide plate 21A and the diffusion plate 26. The off-set arrangement enables light incident on the light guide plate 21A from one side thereof to effectively reach the opposite end of the light guide plate 21A. The opposite tapered surface 21B' adjacent to the opposite end of the light guide plate 21A far from the light source 24 permits light to be emitted therefrom. The position X (FIG. 7) of the apex 21C depends on the length of the light guide plate 21A, the intensity of the light source 24, and the angle of inclination of the tapered surfaces 21b and 21b', etc.

FIG. 7 shows experimental results of the present invention, in comparison with the prior art, similar to FIG. 6. Namely. in FIG. 7, the experiments were carried out under the same conditions as in FIG. 6. Note, the length of the light guide plate 21A was 34 mm. As can be seen in FIG. 7, a substantially uniform luminance distribution was obtained according to the present invention.

We claim:

1. A backlight, comprising:
   a reflection plate;
   a diffusion plate;
   a transparent light guide plate held between the diffusion plate and the reflection plate, said light guide plate having rounded light receiving surfaces on opposite ends thereof, having a reflection and diffusion surface adjacent to the reflection plate, and having a recessed light emitting surface adjacent to the diffusion plate, wherein a space is defined between the recessed light emitting surface and a bottom surface of the diffusion plate adjacent thereto;
   a holder connected to the diffusion plate wherein said rounded light receiving surfaces and said holder define accommodation spaces in the transparent light guide plate; and
   line light sources located in the accommodation spaces wherein the line light sources are surrounded by the holder and the rounded light receiving surfaces of the transparent light guide plate.

2. A backlight according to claim 1, wherein said holder has inner reflection surface portions facing the line light sources and defining the accommodation spaces.

3. A backlight according to claim 2, wherein said recessed light emitting surface has a generally V-shape cross section.

4. A backlight according to claim 3, wherein, in said generally V-shaped light emitting surface, an apex of a V-shape in cross section is located at the center thereof.

5. A backlight according to claim 4, wherein said inner reflection surface portions of the holder are smoothly rounded surfaces.

6. A backlight according to claim 1, wherein said line light sources are cold cathode tubes.

7. A backlight according to claim 1, wherein said line light sources are hot cathode tubes.

8. A backlight according to claim 1, wherein the reflection and diffusion surface of the transparent light guide plate adjacent to the reflection plate is subjected to a rough finish surface treatment.

9. A backlight according to claim 1, wherein the space between the diffusion plate and the recessed light emitting surface of the transparent light guide plate is an air space.

10. A backlight, comprising: a reflection plate; a diffusion plate; a transparent light guide plate held between the diffusion plate and the reflection plate, said light guide plate having a rounded light receiving surface on one end, and having a reflection and diffusion surface adjacent to the reflection plate, and having a recessed light emitting surface adjacent to the diffusion plate, wherein a space is defined between the recessed light emitting surface and a bottom surface of the diffusion plate adjacent thereto; a holder connected to the diffusion plate wherein said rounded light receiving surface and said holder defines an accommodation space on the transparent light guide plate; and line light source located in the accommodation space wherein the line light source is surrounded by the holder and the rounded light receiving surface of the transparent light guide plate.

11. A backlight according to claim 10, wherein said holder has an inner reflection surface portion facing the line light source and defining the accommodation space.

12. A backlight according to claim 10, wherein said inner reflection surface portion of the holder is a smoothly rounded surface.

13. A backlight according to claim 12 wherein said recessed light emitting surface has an eccentric V-shape cross section.

14. A backlight according to claim 13, wherein said eccentric V-shaped emitting surface has an apex of a V-shape thereof located closer to the end thereof that is far from the accommodation space.

15. A backlight according to claim 14, wherein the space between the diffusion plate and the recessed light emitting surface of the transparent light guide plate is an air space.

* * * * *